(12) United States Patent
Kasvand et al.

(10) Patent No.: US 7,177,896 B2
(45) Date of Patent: Feb. 13, 2007

(54) DYNAMIC RULE SETS FOR GENERATED LOGS

(75) Inventors: Tonis Kasvand, Nepean (CA); Thomas Gray, Carp (CA)

(73) Assignee: Mitel Networks Corporation, Ontario (CA)

( * ) Notice: Subject to any disclaimer, the term of this patent is extended or adjusted under 35 U.S.C. 154(b) by 752 days.

(21) Appl. No.: 09/832,619

(22) Filed: Apr. 11, 2001

(65) Prior Publication Data

US 2002/0010912 A1 Jan. 24, 2002

(30) Foreign Application Priority Data

Apr. 12, 2000 (GB) .................. 0008952.4

(51) Int. Cl.
G06F 15/16 (2006.01)
G06F 15/173 (2006.01)
G06F 15/177 (2006.01)
G06F 15/167 (2006.01)

(52) U.S. Cl. ............ 709/200; 709/220; 709/221; 709/223; 709/224; 709/225

(58) Field of Classification Search ........ 709/200–202, 709/220–230, 246; 379/32, 9.04, 9.03; 704/278; 717/4; 713/200; 700/2–7
See application file for complete search history.

(56) References Cited

U.S. PATENT DOCUMENTS 5,367,609 A * 11/1994 Hopper et al. .............. 704/278
5,384,892 A    1/1995 Strong
5,872,931 A *  2/1999 Chivaluri .................... 709/223
6,208,720 B1 * 3/2001 Curtis et al. ............ 379/114.14
6,493,755 B1 * 12/2002 Hansen et al. .............. 709/224

FOREIGN PATENT DOCUMENTS

| EP | 0650302 | 4/1995 |
| EP | 0909075 | 4/1999 |
| EP | 0910197 | 4/1999 |
| EP | 0938076 | 8/1999 |

OTHER PUBLICATIONS

Search Report of Great Britain Application No. 0008952.4.
Search Report of EPO Application No. EP 01 30 3459.

* cited by examiner

Primary Examiner—Anthony Knight
Assistant Examiner—Sunray Chang
(74) Attorney, Agent, or Firm—F. Chau & Associates, LLC

(57) ABSTRACT

A network administration system for automatically activating and deactivating dynamic rule sets in response to receipt of error logs from network devices and applications, comprising a user interface for manually activating and deactivating rule sets having defined rule set criteria and for associating rule set activation keys with the rule sets, wherein said activation keys associate changes in status of the dynamic rule sets, and a program for receiving the error logs and for each of the rule sets in connection with which activation keys have been associated and whose criteria have been satisfied by the error logs, reading the activation keys and one of either activating or deactivating the dynamic rule sets in accordance with the associated changes in status.

5 Claims, 5 Drawing Sheets

Figure 2

| HLL ID | Rule Set Status | Rule ID | Rule Set Activation Keys | | Rule Set Details | Brief Explanation |
|---|---|---|---|---|---|---|
| HLL001 | ON | RSID001 | RSID004 | ON | (LogP6000 or LogP6001 or LogP6002) from 2 or more phones. | Two or more phones are not receiving full services |
|  |  |  | RSID005 | ON |  |  |
| HLL002 | ON | RSID002 | RSID005 | ON | LogPBX2000 + LogC3000 | Loss of services. Something is wrong with PBX2 |
| HLL003 | OFF | RSID003 | RSID007 | ON | HLL001 + HLL002 | Loss of services. Something is wrong with T1 trunk. |
| HLL004 | OFF | RSID004 |  |  | Count all error logs generated from network up to 100 errors. | Count errors on system. If over 100 errors issue log HLL004 |
| HLL005 | OFF | RSID005 |  |  | Count features that are missing up to 10 features | Count features that are missing. If over 10 features, issue log HLL005 |
|  | OFF | RSID006 | RSID006 | OFF | Search for >2 ping T1 Logs | Continue to monitor bad T1 trunk for any signs of life. |
|  |  |  | RSID007 | OFF |  |  |
|  | OFF | RSID007 | RSID006 | OFF | LogT1003 | Status of T1 trunk good. |
|  |  |  | RSID007 | OFF |  |  |

Figure 3

| Log ID | Time Generated | Brief Description | Rule Set Explanation |
|---|---|---|---|
| LogP6000 | Feb. 29, 2000 14:23:04:12 | No dial tone for phone P2. | |
| LogPBX2000 | Feb. 29, 2000 14:23:04:17 | PBX 1 is not receiving full services | |
| LogP6001 | Feb. 29, 2000 14:23:04:27 | Reduction of features available for phone P4. | |
| LogC3000 | Feb. 29, 2000 14:23:04:32 | Client C1 cannot give services to phones.. | |
| HLL002 | Feb. 29, 2000 14:23:04:32 | Loss of services on network. | Rule ID RSID002 was satisfied and created this log HLL002. When it created this log it also activated the rule set RSID005. |
| LogP6002 | Feb. 29, 2000 14:23:05:00 | No services available for phone P1. | |
| HLL001 | Feb. 29, 2000 14:23:05:03 | PBX 1 is not providing full services to phone. | Rule ID RSID001 was satisfied and created this log HLL001. When it created this log it also activated the rule set RSID005. |
| HLL003 | Feb. 29, 2000 14:23:05:05 | Trunk T1 is unavaliable | |
| LOGT1001 | Feb. 29, 2000 15:12:00:03 | Trunk T1 pinging PBX. | |
| LOGT1001 | Feb. 29, 2000 15:12:00:05 | Trunk T1 pinging PBX. | |
| LOGT1001 | Feb. 29, 2000 15:12:00:07 | Trunk T1 pinging PBX. | Rule ID RSID006 was satisfied and deactivated the rule RSID006 (itself) and RSID007. |
| LOGT1003 | Feb. 29, 2000 15:13:15:25 | Trunk T1 is in full service. | |

Figure 4

Smart Logs
File Edit View Tools... etc.

Dynamic Rule Sets Entry Page

| Rule Set ID | Rule Set Status | Rule Set Activation Key | |
|---|---|---|---|
| | | Rule Set ID | Change Status |
| RSID001 | ON | RSID004 | ON |
| | | RSID005 | ON |
| RSID002 | ON | RSID005 | ON |
| RSID003 | OFF | RSID007 | ON |
| RSID004 | OFF | | |
| RSID005 | OFF | | |
| RSID006 | OFF | RSID006 | OFF |
| | | RSID007 | OFF |
| RSID007 | OFF | RSID006 | OFF |
| | | RSID007 | OFF |

- Add Dynamic Rule Set
- Edit Dynamic Rule Set
- Delete Dynamic Rule Set

- Add Rule Set Activation Key
- Edit Rule Set Activation Key
- Delete Rule Set Activation Key

# DYNAMIC RULE SETS FOR GENERATED LOGS

FIELD OF THE INVENTION

This invention relates in general to network diagnostics, and more particularly to a network administration system for automatically activating dynamic rule sets in response to satisfying the criteria of existing static rule sets of error logs in a network.

BACKGROUND OF THE INVENTION

It is well known in traditional computer and digital communication networks for technicians to respond to the generation of error logs by notifying affected users of system problems, analyzing and then fixing the problems using an assortment of software commands and/or tools. The use of such software commands is often repetitive and requires the technician to manually enter the commands upon each observation of a specific log. Thousands of logs can be generated by a single problem. For example, if a T1 line goes down, error logs could be generated by thousands of phones that cannot find a dial tone.

Therefore, according to the prior art, automatic filtering of error logs has been effected through the use of "rule sets" to determine if a combination of logs satisfies a given criteria. One example of such an automated process is a product from Plexis (http://www.triadhc.com/edi.shtml) called Plexis EDI Toolkit. If the criteria is satisfied, it is known in the art either to generate a further log or to provide an overall summary for describing the problem to the technician. Thus, it is known to generate Higher Level Logs (HLL) from Lower Level Logs (LLL) in response to predetermined rule sets being satisfied. The Lower Level Logs (LLL) are generated by network applications or devices. Such systems are valuable because the HLLs help to explain to the system administrator/designer what is really going on in the system.

There are instances where HLL's generate more HLL logs, or combinations of LLL's and HLL's generate new HLL's. According to the prior art, these rule sets are either manually applied by the technician as required, which can be a time consuming and complicated task where many logs have been generated, or the rule sets remain activated at all times, in which case analysis of the logs becomes time consuming since many rule sets need to be examined.

SUMMARY OF THE INVENTION

According to the present invention, a network administration system is provided for automatically activating and deactivating dynamic rule sets when specified static rule sets have been satisfied. The static rule sets whose criteria have been satisfied by the generation of predetermined error logs trigger activation or deactivation of the dynamic rule sets. The automatic activation and deactivation of dynamic rule sets alleviates time consuming manual application of rule sets. The causal activation and deactivation of the dynamic rule sets only when other rule set criteria have been satisfied reduces the number of rule sets when compared to the prior art approach of activating all rule sets at all times.

The system of the present invention may advantageously be applied to any application that generates logs and is monitored by rule sets, to allow dynamic variations in monitoring when different problems arise, and to set explicit instructions for specific circumstances of logs.

BRIEF DESCRIPTION OF THE DRAWINGS

A detailed description of the preferred embodiment is set forth herein below with reference to the following drawings, in which:

FIG. 2 is a table of a set of rules that have been defined for use in the network of FIG. 1;

FIG. 3 is a table showing an exemplary list of logs generated by the network of FIG. 1;

FIG. 4 shows a graphical user interface for entering dynamic rule sets; and

DETAILED DESCRIPTION OF THE PREFERRED EMBODIMENT

Figure 1:
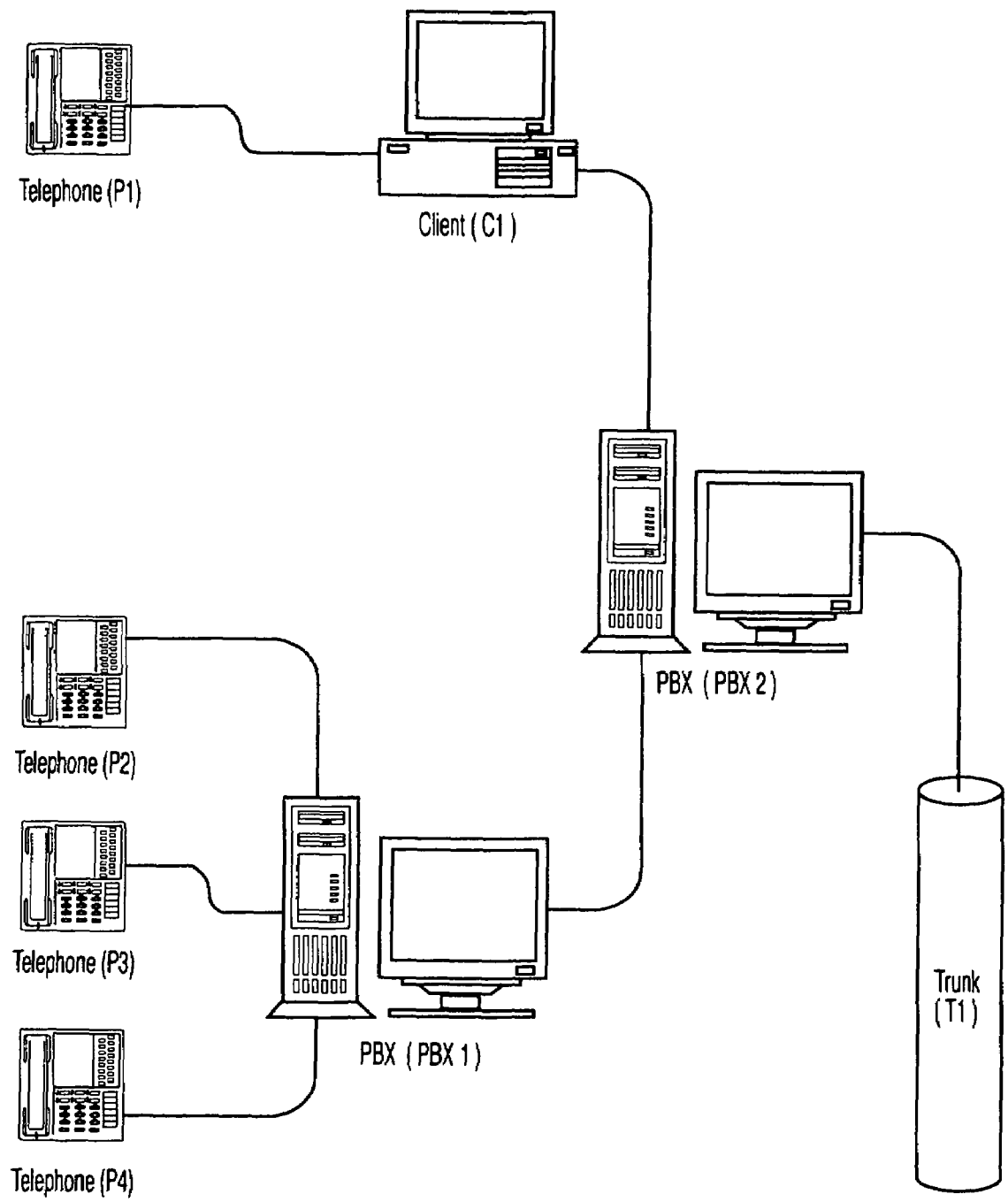
FIG. 1 is a block diagram of an exemplary network incorporating the system of the present invention.

FIG. 1 shows a typical network comprising a plurality of phones (P1 to P4) connected to a server implemented PBX (PBX1), a further phone P1 connected to a client server C1, both the client C1 and PBX 1 being connected to a PBX2. The PBX 2 is connected to a T1 trunk in a well known manner. Each of the devices shown in FIG. 1, with the exception of the trunk, has the capability of generating logs to inform a technician of the device status. The network configuration is for illustration purposes only, and may incorporate a host of other devices and networks.

As indicated above, FIG. 2 demonstrates a set of rule sets that are defined for use in the network in FIG. 1, and FIG. 3 shows a typical list of logs (HLL's and LLL's) that are generated from the network in FIG. 1 as well as associated explanations of how dynamic rule sets are created. The explanation does not form part of the error log, which is restricted to the Log ID, Time Generated and Brief Description. The system parses the Brief Description in order to identify the source of a particular error log.

According to the invention, a network administration system is provided for programming the activation and deactivation of dynamic rule sets in response to network conditions. Thus, with reference to FIG. 4, a user interface is provided for activating and deactivating certain rule sets (identified by rule set Ids, such as RSID001, RSID02, etc), and associating rule set activation and deactivation keys. Thus, the rule set identified by RSID001 has been activated by the user and programmed to activate rules sets RSID004 and RSID005 when its rule set criteria have been satisfied (i.e. LogP6000 or LogP6001 or LogP6002) have been received from two or more phones). When the criteria for rule set RSID001 have been satisfied, HLL001 will be generated and the Rule Set Status for RSID004 and RSID005 will change in FIG. 2 from OFF to ON. Likewise, when the rule set criteria for RSID004 has been satisfied (i.e. more than one hundred system error logs have been counted), HL004 is generated. The activated rule sets remain active until reset by the user, by another rule set, or by timing out. According to the scenario of FIGS. 2–4, RSID006 has been deactivated by the user. However, if activated by the user this rule set monitors the faulty T1 trunk for activity (i.e. the rule set is Search for >2 ping T1 logs). The log details of FIG. 3 show LOGT001 being generated three times in succession, thereby satisfying the RSID006 rule set which, according to the user configuration of FIGS. 2 and 4, results in self-deactivation of the rule set (as well as deactivation of rule set RSID007).

Figure 5:
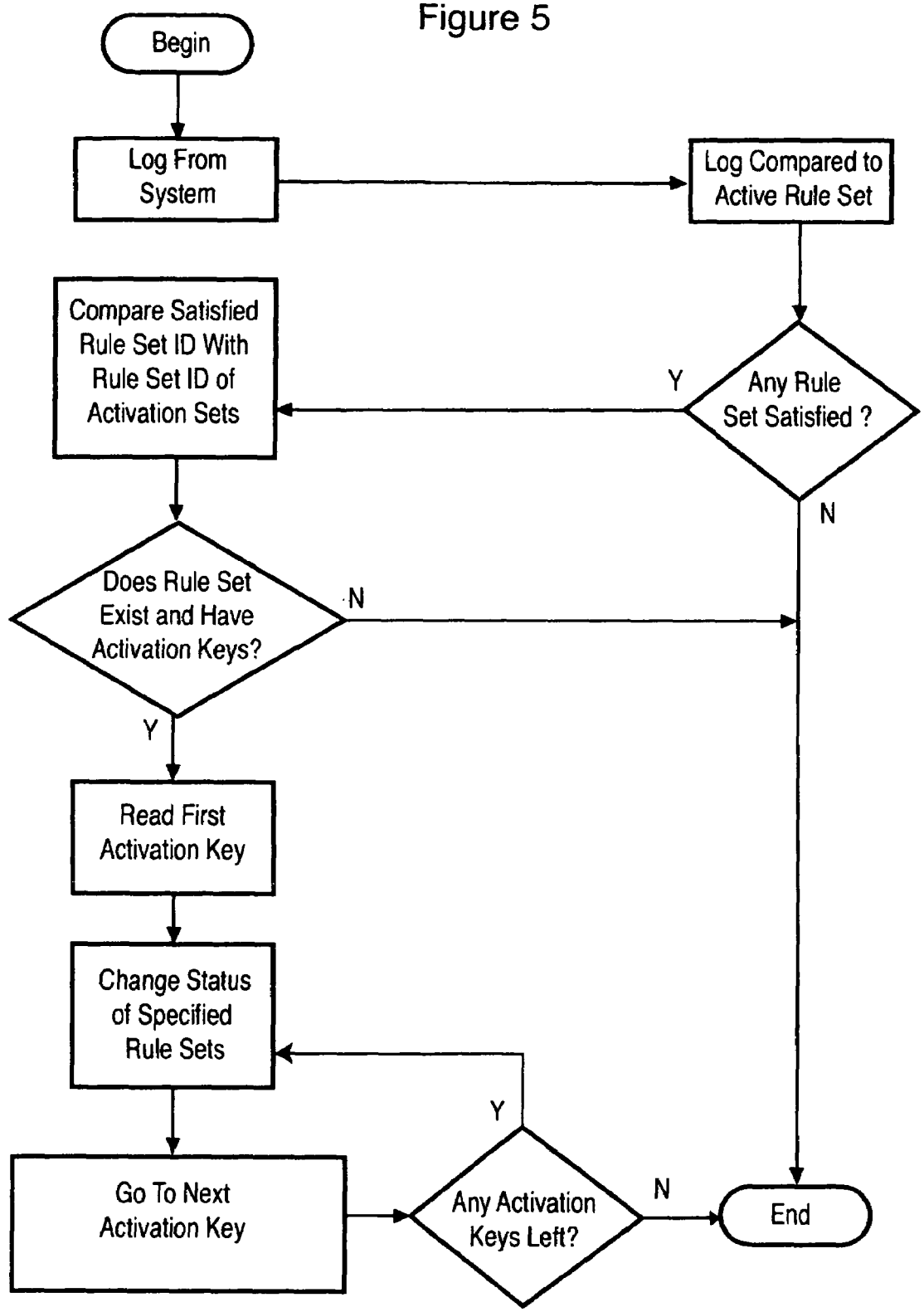
FIG. 5 is a flowchart showing activation and deactivation of dynamic rule sets.

The activation and deactivation of rule sets is triggered by using software tools (e.g. Visual Basic, C++) to read and compare the logs to active rule sets, as shown in FIG. 5. If a rule set is fully satisfied, its rule set ID is compared with the rule set Ids of any associated activation keys (as programmed by the user). If the rule set has activation keys programmed, the first such activation key is read, the status of the specified rule set is changed, and remaining activation keys are read and changed in the same manner until no activation keys remain for the rule set.

Exemplary pseudo-code of the process for implementing the network administration system of the present invention is as follows:

```
Dynamic rule sets function prog
    Retrieve log
    Compare logs with rule sets
    If rule set fully satisfied
        If rule set has activation keys
            Go to first activation key
            While activation keys exist
                Set status of specified rule set id
                Go to next activation key
            endwhile
        endif
    endif
End dynamic rule sets function prog
```

Alternatives and modifications of the invention are possible within the sphere and scope as set forth in the claims appended hereto.

What is claimed is:

1. A network administration system comprising:
a user interface for manually activating and deactivating rule sets having defined rule set criteria and for associating rule set activation keys with said rule sets, wherein said activation keys associate changes in status of other rule sets; and
program means for receiving said error logs from at least one of network devices and applications and for each of said rule sets in connection with which activation keys have been associated and whose criteria have been satisfied by said error logs, reading said activation keys and one of either automatically activating or automatically deactivating said other rule sets in accordance with said associated changes in status so as to cause the status of said other rule sets to change.

2. The network administration system of claim 1 wherein, said program means is implemented via pseudo-code comprising:

```
Dynamic rule sets function prog
    Retrieve log
    Compare logs with rule sets
    If rule set fully satisfied
        If rule set has activation keys
            Go to first activation key
            While activation keys exist
                Set status of specified rule set id
                Go to next activation key
            endwhile
        endif
    endif
End dynamic rule sets function prog.
```

3. A method of automatically activating and deactivating rule sets in response to receipt error logs form network devices and applications, comprising the steps of:
manually activating predetermined rule sets having defined rule set criteria;
associating rule set activation keys with said predetermined rule sets, wherein said activation keys associated changes in status of other rule sets;
receiving said error logs; and
comparing said error logs with said predetermined rule sets and for each of said predetermined rule sets in connection with which activation keys have been associated and whose criteria have been satisfied by said error logs, reading said activation keys and one of either automatically activating or automatically deactivating said other rule sets in accordance with said associated changes in status so as to cause the status of said other rule sets to change.

4. A software product automatically activating and deactivating dynamic rule sets in response to receipt of error logs from network devices and applications, comprising:
a user interface for manually activating and deactivating rule sets having defined rule set criteria and for associating rule set activation keys with said rule sets, wherein said activation keys associate changes in status of other rule sets; and
program means for receiving said error logs from at least one of network devices and applications and for each of said rule sets in connection with which activation keys have been associated and whose criteria have been satisfied by said error logs, reading said activation keys and one of either automatically activating or automatically deactivating said other rule sets in accordance with said associated changes in status so as to cause the status of said other rule sets to change.

5. The software product of claim 4, wherein said program means is implemented via pseudo-code comprising:

```
Dynamic rule sets function prog
    Retrieve log
    Compare logs with rule sets
    If rule set fully satisfied
        If rule set has activation keys
            Go to first activation key
            While activation keys exist
                Set status of specified rule set id
                Go to next activation key
            endwhile
        endif
    endif
End dynamic rule sets function prog.
```

* * * * *